United States Patent
Jacobson et al.

(10) Patent No.: US 12,506,615 B2
(45) Date of Patent: Dec. 23, 2025

(54) SOURCE AUTHENTICATION FOR CONTENT AGGREGATORS

(71) Applicant: GOOGLE LLC, Mountain View, CA (US)

(72) Inventors: Alex Jacobson, Mountain View, CA (US); Laura Eidem, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 289 days.

(21) Appl. No.: 18/124,098

(22) Filed: Mar. 21, 2023

(65) Prior Publication Data

US 2024/0323024 A1  Sep. 26, 2024

(51) Int. Cl.
 *H04L 9/32* (2006.01)
 *G06F 21/62* (2013.01)
 *H04L 9/08* (2006.01)

(52) U.S. Cl.
 CPC ........ *H04L 9/3236* (2013.01); *G06F 21/6209* (2013.01); *H04L 9/0825* (2013.01); *H04L 9/3247* (2013.01); *G06F 2221/2141* (2013.01)

(58) Field of Classification Search
 CPC ... H04L 9/3236; H04L 9/0825; H04L 9/3247; G06F 21/6209; G06F 2221/2141
 See application file for complete search history.

(56) References Cited

U.S. PATENT DOCUMENTS

| | | | |
|---|---|---|---|
| 2012/0222133 A1* | 8/2012 | Kidron | H04L 51/52 726/28 |
| 2017/0124590 A1* | 5/2017 | Griesmeyer | H04L 67/125 |
| 2018/0137588 A1* | 5/2018 | Kenthapadi | G06Q 50/2053 |
| 2019/0026786 A1* | 1/2019 | Khoury | G06Q 30/0271 |

(Continued)

FOREIGN PATENT DOCUMENTS

WO  WO-2019/164926 A1  8/2019

OTHER PUBLICATIONS

Matt A.V. Chaban, "Can Blockchain Block Fake News and Deep Fakes", retrieved from the internet: https://www.ibm.com/blogs/industries/blockchain-protection-fake-news-deep-fakes-safe-press/, Jun. 25, 2022, 10 pages.

(Continued)

*Primary Examiner* — Techane Gergiso
(74) *Attorney, Agent, or Firm* — MARSHALL, GERSTEIN & BORUN LLP (57) ABSTRACT

A method for establishing content authenticity when aggregating content includes receiving a content package that includes a content item hosted by a content publisher site and a first digital signature. The method also includes determining whether the content package satisfies authenticity criteria, at least in part by decrypting the first digital signature using a first public key to produce a plurality of hashes. The first public key is associated with a particular content publisher, the plurality of hashes includes a hash of first data that includes at least a first portion of the content item and a hash of second data that includes at least a second (Continued)

portion of the content item and omits at least the first portion. The method also includes providing aggregated content to content consumers, by including or restricting access to a link based on whether the content package satisfies the authenticity criteria.

20 Claims, 6 Drawing Sheets

(56) References Cited

U.S. PATENT DOCUMENTS

| | | | |
|---|---|---|---|
| 2019/0230153 A1* | 7/2019 | Mcphee | G06N 20/00 |
| 2019/0279240 A1* | 9/2019 | DiTomaso | H04L 9/0643 |
| 2020/0044828 A1 | 2/2020 | Rice | |
| 2020/0084045 A1 | 3/2020 | Cohen et al. | |
| 2020/0235943 A1 | 7/2020 | Salimi et al. | |
| 2020/0387545 A1* | 12/2020 | Tripathi | G06N 3/045 |
| 2021/0004790 A1 | 1/2021 | Di Iorio | |
| 2021/0279305 A1* | 9/2021 | Goldston | G06F 16/41 |
| 2021/0374211 A1 | 12/2021 | Lewis et al. | |
| 2022/0210061 A1* | 6/2022 | Simu | H04L 9/3239 |
| 2023/0075182 A1* | 3/2023 | Galuten | G06Q 20/223 |
| 2023/0120534 A1* | 4/2023 | Jakobsson | G06Q 20/3829 705/39 |
| 2023/0245247 A1* | 8/2023 | Xiong | G06Q 20/123 705/69 |

OTHER PUBLICATIONS

News Certification Blockchain Platform, "Introducing Safe.press", retrieved from the internet: https://www.block-expert.com, Mar. 21, 2023, 5 pages.

* cited by examiner

SOURCE AUTHENTICATION FOR CONTENT AGGREGATORS

FIELD OF THE DISCLOSURE

The present disclosure relates to authentication and, more particularly, to systems and methods that enable content aggregators to authenticate content.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Digital content publishers (e.g., publishers of news, opinion pieces, images, etc.) often find that their content is copied and published in an unauthorized manner by so-called "copycat" sites. In many cases, consumers find such content via content aggregators such as Google News. Content aggregators may run classifiers that assess the quality of content to determine whether to include the content into their aggregated results. Because content that originally came from large or respected publishers tends to be of relatively high quality (e.g., well-written articles), unauthorized copies of such content often satisfy the content aggregator classifiers. As a result, high-value user traffic may be directed to the copycat sites, which may be, for example, websites created purely for purposes of drawing traffic that generates ad revenue. Copycat sites might even outperform authentic sites due to aggressive search engine optimization.

SUMMARY

In one aspect, a method for establishing content authenticity when aggregating content includes: receiving, by a computing system that includes one or more processors, a content package that includes (i) a content item hosted by a content publisher site, and (ii) a first digital signature associated with the content item; determining, by the computing system, whether the content package satisfies a set of authenticity criteria, at least in part by decrypting the first digital signature using a first public key to produce a plurality of hashes, wherein the first public key is associated with a particular content publisher, a first hash of the plurality of hashes is a hash of first data that includes at least a first portion of the content item, and a second hash of the plurality of hashes is a hash of second data that includes at least a second portion of the content item and omits at least the first portion of the content item; and providing, by the computing system, aggregated content to content consumers, wherein providing the aggregated content includes (i) when determining that the content package satisfies the set of authenticity criteria, including, in the aggregated content, a link to the content item hosted by the content publisher site, and (ii) when determining that the content package does not satisfy the set of authenticity criteria, restricting, in the aggregated content, access to the link to the content item hosted by the content publisher site.

In another aspect, a computing system includes one or more processors and one or more memories storing instructions. When executed by the one or more processors, the instructions cause the computing system to: receive a content package that includes (i) a content item hosted by a content publisher site, and (ii) a first digital signature associated with the content item; determine whether the content package satisfies a set of authenticity criteria, at least in part by decrypting the first digital signature using a first public key to produce a plurality of hashes, wherein the first public key is associated with a particular content publisher, a first hash of the plurality of hashes is a hash of first data that includes at least a first portion of the content item, and a second hash of the plurality of hashes is a hash of second data that includes at least a second portion of the content item and omits at least the first portion of the content item; and provide aggregated content to content consumers, wherein providing the aggregated content includes (i) when determining that the content package satisfies the set of authenticity criteria, including, in the aggregated content, a link to the content item hosted by the content publisher site, and (ii) when determining that the content package does not satisfy the set of authenticity criteria, restricting, in the aggregated content, access to the link to the content item hosted by the content publisher site.

DETAILED DESCRIPTION

Figure 1:
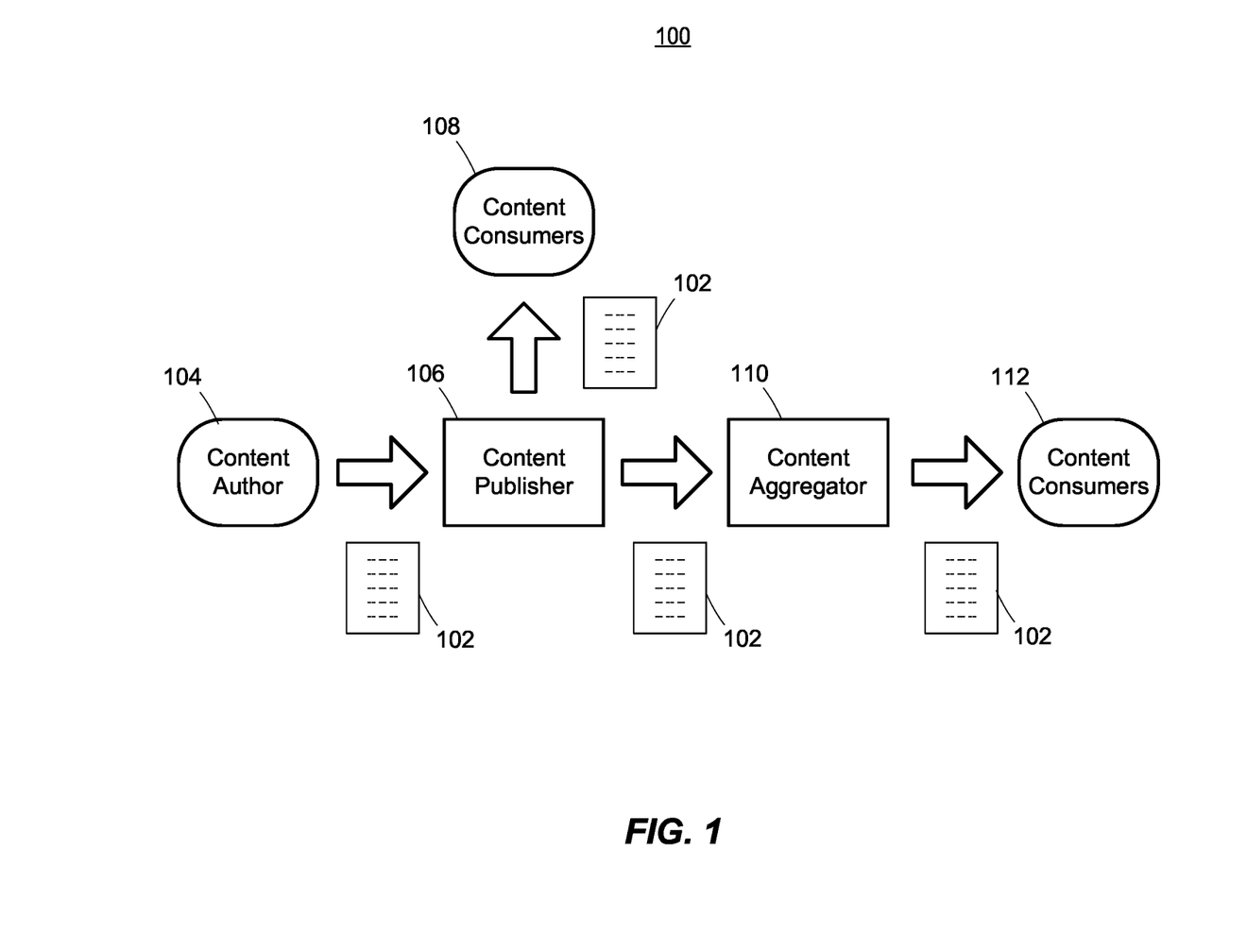
FIG. 1 depicts an example flow of content from an author to a consumer.

FIG. 1 depicts an example flow 100 for a content item 102 created by an author 104, in a content aggregation setting. Initially, the author 104 creates (e.g., writes, designs, etc.) the content item 102, which may be a news article, an opinion piece, a blog, or any other type of original, digital content that the author 104 intends to share or distribute (directly, or via an agent, etc.). The content item 102 may be text only, or any combination of text, images, and/or video. In some scenarios and/or implementations, the content item 102 may be (or include) an audio file. For example, the content item 102 may be a song recording, a text-to-voice translation of a news article, a podcast recording, and so on.

To facilitate dissemination of the content item 102, the content author 104 provides the content item 102 to a content publisher 106. The content publisher 106 may be a news source such as CNN or The New York Times, for example, or a publisher of music or digital art, etc. In some cases, the author 104 provides the content item 102 to the content publisher 106 as a part of a financial transaction (e.g., if the author 104 sells certain rights to the content item 102 to the content publisher 106).

The content publisher 106 publishes the content item 102 on a digital forum for consumption by content consumers 108, by hosting the content item 102 on a site (e.g., a web page). In addition to direct consumption by "end users" such as consumers 108, a content aggregator 110 may aggregate content provided by content publisher 106 and one or more other content publishers not shown in FIG. 1. For example, the content aggregator 110 may host/maintain a website that provides links to a periodically changing collection of content items hosted by the various content publishers. The content aggregator 110 may be a news aggregator that hosts a website or mobile application, for example, or may be an entity that curates collections of blogs, podcasts, songs, digital art, and/or other content.

Whereas consumers 108 consume the content item 102 (e.g., read or view the content item 102 online) directly from the content publisher 106, other consumers 112 may consume the content item 102 via a link provided by the content aggregator 110. The content aggregator 110 may use any suitable algorithm(s) for selecting content publishers and/or content items to include (e.g., include a link to) within the aggregated content, and possibly also for ranking or scoring publishers and/or content items. For example, the content aggregator 110 may run algorithms that rank individual content items, and cause higher ranking content items to be more easily discoverable by content consumers 112 (e.g., by placing higher ranking content items in more prominent positions in the aggregated content, such as higher or earlier in an ordered list of content items).

As the term is used herein, "aggregated content" may refer to the entirety of each of the aggregated content items, or to respective links to the aggregated content items that are each accompanied by an indicator of the subject matter of the associated content item (e.g., an article headline, byline, and/or lede). In some implementations, each link includes a uniform resource locator (URL) address associated with the respective content publisher (e.g., content publisher 106 for content item 102), and a consumer selecting a link from among the aggregated content is transferred to the corresponding web page of the content publisher.

Figure 2:
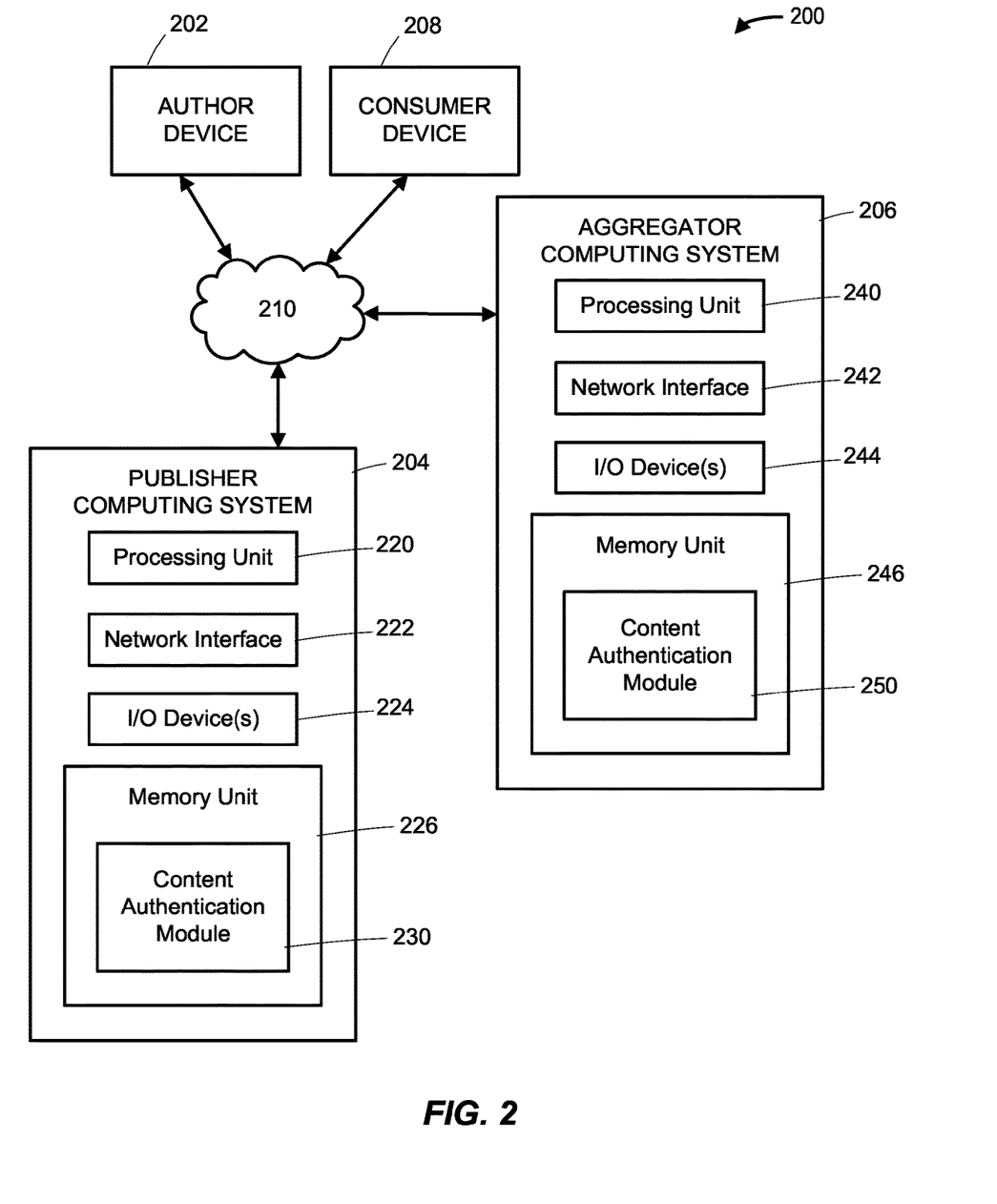
FIG. 2 is a block diagram of example system in which content may be created, published, aggregated, and consumed.

FIG. 2 is a block diagram of example system 200 in which content may be created, published, aggregated, and consumed (e.g., according to the flow 100 of FIG. 1). The system 200 includes an author device 202 (e.g., a device of the author 104), a publisher computing system 204 (e.g., a computing system of the publisher 106), an aggregator computing system (e.g., a computing system of the aggregator 110), and a consumer device (e.g., a device of one of the consumers 112). A network 210 communicatively couples at least some of the author device 202, the publisher computing system 204, the aggregator computing system 206, and the consumer device 208 (e.g., as needed to support the various communications discussed herein).

Each of the author device 202 and the consumer device 208 may be any computing device (or combination of devices) with communication capability, such as a desktop computer, laptop computer, or mobile device, for example. While not shown in FIG. 1, author device 202 and consumer device 208 each include one or more processors, one or more memories storing instructions to be executed by the one or more processors, a network interface for communicating via network 210, and one or more input/output devices (e.g., a touchscreen, keyboard, etc.), to enable the operations discussed herein.

The publisher computing system 204 may be a server or any other suitable type of computing device. In the example embodiment shown in FIG. 2, the publisher computing system 204 includes a processing unit 220, a network interface 222, one or more input/output (I/O) devices 224, and a memory unit 226. In some implementations, however, the publisher computing system 204 includes two or more computers that are co-located or remote from each other, or some combination thereof. In these distributed embodiments, the operations described herein relating to the processing unit 220 and/or the memory unit 226 may be divided among multiple processing units and/or memories, respectively.

The processing unit 220 includes one or more processors, each of which may be a programmable microprocessor that executes software instructions stored in the memory unit 226 to execute some or all of the functions of the publisher computing system 204 as described herein. Alternatively, some of the processors in the processing unit 220 may be other types of processors (e.g., application-specific integrated circuits (ASICs), field-programmable gate arrays (FPGAs), etc.), and some of the functionality of the publisher computing system 204 as described herein may instead be implemented, in part or in whole, by such hardware. The memory unit 226 may include one or more physical memory devices or units containing volatile and/or non-volatile memory. Any suitable memory type or types may be used, such as read-only memory (ROM), solid-state drives (SSDs), hard disk drives (HDDs), and so on.

The network interface 222 includes one or more interfaces (hardware, software, and/or firmware) configured to enable communications with at least author device 202 and aggregator computing system 206 via network 210. For example, network interface 222 may include an Ethernet interface.

The I/O device(s) 224 may include a display using any suitable display technology (e.g., LED, OLED, LCD, etc.) to present information to a user, and a user input device such as a keyboard, mouse, trackpad, graphics/drawing tablet, or other suitable input device. In some implementations, the I/O device(s) 224 include an integrated input-output device such as a touchscreen display. Generally, the I/O device(s) 224 jointly enable(s) a user to interact with graphical user interfaces (GUIs) provided by the publisher computing system 204, e.g., for purposes such as reviewing content from author devices (e.g., author device 202) and/or manually verifying that such content has been properly authenticated according to techniques disclosed herein. In some implementations, however, the publisher computing system 204 does not include the I/O device(s) 224.

The memory unit 226 stores the instructions of one or more software modules or applications, including a content authentication module 230. The content authentication module 230, when executed by the processing unit 220, is generally configured to perform authentication-related tasks such as authenticating (e.g., validating digital signatures for) content items provided by author devices (e.g., device 202), or authenticating transactions relating to such content items, and providing authentication information (e.g., digital signatures) to other devices or systems (e.g., to computing system 206). In particular, the operations of the publisher computing system 204 that are discussed below in connection with FIG. 3 may be performed, or caused/triggered, by the content authentication module 230.

The aggregator computing system 206 may be a server or any other suitable type of computing device. In the example embodiment shown in FIG. 2, the aggregator computing system 206 includes a processing unit 240, a network interface 242, one or more I/O devices 224, and a memory unit 246, which may be similar to processing unit 220, network interface 222, I/O device(s) 224, and memory unit 226, respectively. In some implementations, the aggregator computing system 206 includes two or more computers that are co-located or remote from each other, or some combination thereof. In these distributed embodiments, the operations described herein relating to the processing unit 240 and/or the memory unit 246 may be divided among multiple processing units and/or memories, respectively. The network interface 242 includes one or more interfaces (hardware, software, and/or firmware) configured to enable communications with at least publisher computing system 204 and consumer device 208 via network 210.

Whereas the memory unit 226 stores the instructions of content authentication module 230, the memory unit 246 stores the instructions of content authentication module 250. The content authentication module 250, when executed by the processing unit 240, is generally configured to perform authentication-related tasks such as authenticating (e.g., validating digital signatures for) content items provided by content publisher computing systems (e.g., computing system 204), or authenticating transactions relating to such content items. In particular, the operations of the aggregator computing system 206 that are discussed below in connection with FIG. 3 may be performed, or caused/triggered, by the content authentication module 250.

The network 210 may be a single communication network, or may include multiple communication networks of one or more types (e.g., one or more wired and/or wireless personal or local area networks (PANs or LANs), and/or one or more wide area networks (WANs) such as the Internet). In some embodiments, the network 210 includes multiple, entirely distinct networks (e.g., one network for communications between computing system 204 and user author device 202, a separate network for communications between computing systems 204 and 206, and another separate network for communications between computing system 206 and consumer device 208).

In blockchain or other distributed ledger implementations (e.g., as discussed below), the system 200 may also include any number of devices representing distributed ledger nodes that validate changes to the distributed ledger according to a set of consensus rules.

Figure 3:
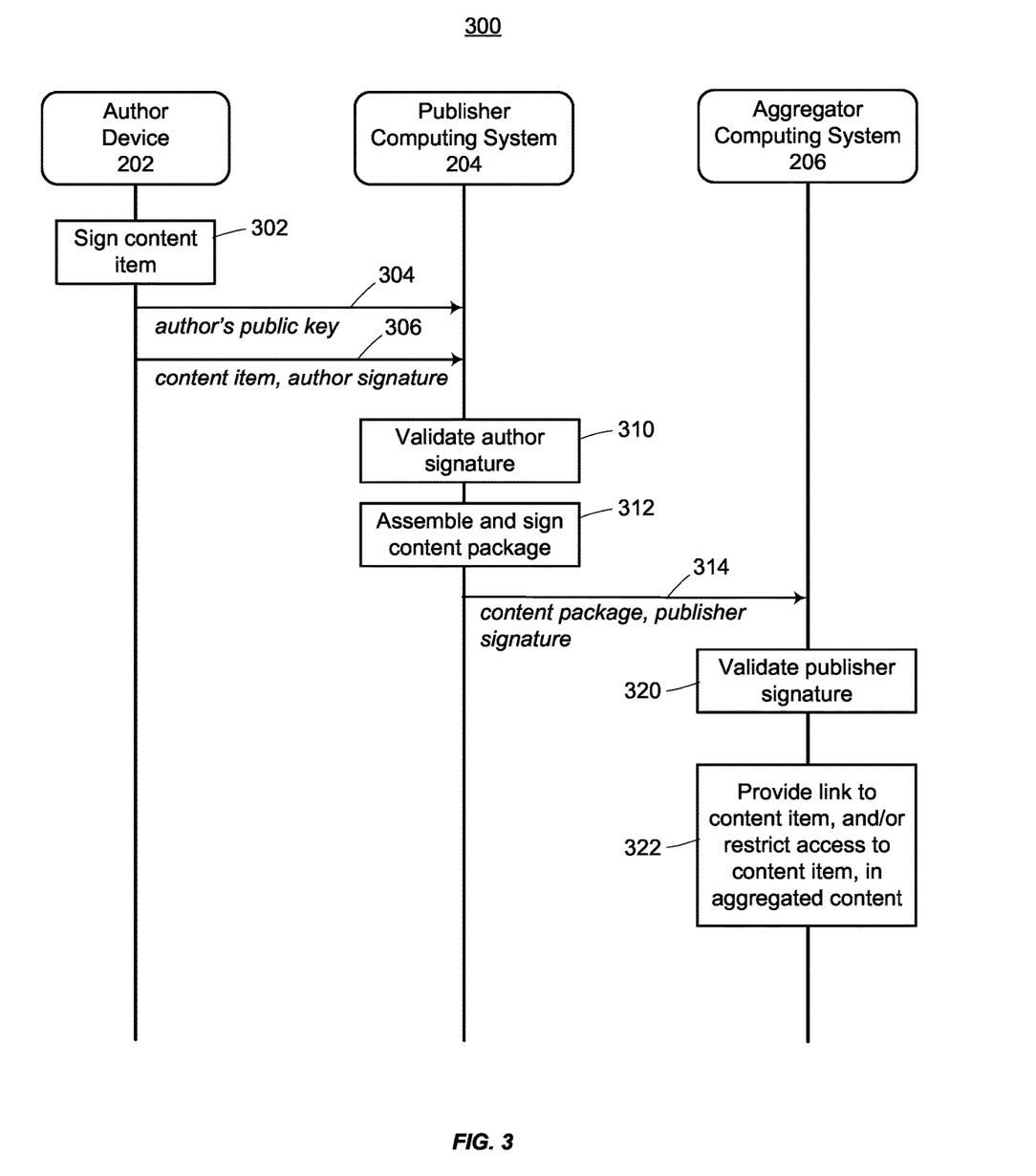
FIG. 3 is a message diagram depicting example communications within the system of FIG. 2.

Example operations of the components of the system 200 will now be described with reference to the message diagram 300 of FIG. 3. As seen in FIG. 3, the author device 202 digitally signs 302 a content item (e.g., content item 102). The signing 302 may occur in response to a user (e.g., the author) selecting an option, provided on a GUI presented by device 202, to add his or her digital signature to the content item, or may occur automatically when the user selects an option to send or share the content item, etc. To sign 302 the content item, the author device 202 may obtain a hash of the content item using any suitable hashing algorithm (e.g., SHA-256, SHA-1, SHA-2, SHA-3, MD-5, etc.), and then encrypt the hash using the author's private key, which is securely stored at the author device 202. In some implementations, the author device 202 obtains multiple hashes corresponding to different portions of the content item (as discussed in further detail below), and then uses the private key to encrypt all of the hashes.

In the example implementation shown, the author device 202 sends 304 the author's public key to the publisher computing system 204. This public key, and the author's private key used to sign 302 the content item, form a cryptographic private-public key pair of the author. The author device 202 also sends 306 the content item, along with the signature generated at event 302, to the publisher computing system 204. In some implementations, the author device 202 instead sends 304 the public key at an earlier time (before event 302), a later time (e.g., after event 306), or in a single transmission with the content item and author signature. In still other implementations, the publisher computing system 204 obtains the author's public key from a source other than the author device 202 (e.g., from a trusted website that provides multiple authors' public keys).

The author device 202 may also send the publisher computing system 204 other information related to the content item, e.g., in the message of event 306 or as one or more separate communications. For example, the author device 202 may also send the publisher computing system 204 the intended date of publication and/or the intended publication source. The intended publication source may be the name or another indication of the content publisher 204, for example. In some implementations, the author device 202 digitally signs not only the content item, but also some or all of this related information.

After receiving the author's public key, the content item (possibly with related information), and the author signature, the publisher computing system 204 validates 310 the author signature using the author's public key received at event 304 (or obtained by other means, as discussed above). Event 310 may include decrypting the signature using the author's public key to obtain a first hash, hashing the content item to generate a second hash, and then comparing the first hash and the second hash to determine whether a match exists. If, and only if, the two hashes match, the author signature is determined to be valid. In implementations where the author also signed additional information, this process may involve hashing the entire package (content item plus other information), or generating separate hashes for separate pieces of information (e.g., one for the content item, one for the publication date, etc.).

If the author's signature is determined to be valid at event 310, the publisher computing system 204 assembles and signs 312 a content package that includes the content item and possibly additional information. For example, the content package may include the author's signature, and any other original content that the author device 202 signed or otherwise provided. The content package may also include a hash of the entire content item, and/or hashes of one or more portions of the content item (e.g., only the first/introductory paragraph, or only an abstract, etc.). By including multiple content hashes in the signature, each corresponding to a different portion of the content item, the ability to partially rewrite the content item is greatly curtailed. As another example, the content package may include a public key of the content publisher.

In still another example, the content package may include a URL address of a site that provides a listing of entities authorized to publish (e.g., republish) the content item, such as a URL of a site hosting an app-ads.txt file and/or a list of eligible monetization networks. Alternatively or additionally, the content package may include an indication of whether content consumers are eligible to access the content item. For example, the content package may indicate whether a subscription is required in order for content consumers to view or otherwise access the content item (e.g., including information relating to tiering, regional requirements, trial periods, etc.), and/or whether and/or how sharing of the content item is permitted (e.g., whether sharing of only the link, a partial summary, or the entire content item is permitted).

At event 312, after assembling the content package, the publisher computing system 204 signs the content package using a private key of the content publisher (e.g., a private key securely stored in memory unit 226). Similar to the signing at event 302, the publisher computing system 204 may use any suitable hashing algorithm (e.g., SHA-256, SHA-1, SHA-2, SHA-3, MD-5, etc.), and then encrypt the hash or hashes using the publisher's private key.

The publisher computing system 204 then sends 314 the signed content package (i.e., the content package and the publisher's digital signature) to the aggregator computing system 206. The aggregator computing system 206 then validates 320 the signature using the publisher's public key, which the aggregator computing system 206 may have received from the publisher computing system 204 (e.g., at event 314), or may have obtained by other suitable means. Event 320 may include decrypting the signature using the publisher's public key to obtain a plurality of hashes, at least two of which correspond to different portions of the content item (e.g., one for the entire content item, and one for just a portion thereof), and then comparing those hashes to the expected hashes. If, and only if, the hashes match, the publisher signature is valid. In implementations where the publisher also signed additional information as discussed above (e.g., URL location, subscription information, etc.), this process may involve hashing the entire content package (content item plus other information), or generating separate hashes for the content item and for other pieces of information (e.g., two for different portions the content item, one for the URL, etc.).

Based on whether the publisher signature is valid, the aggregator computing system 206 either provides a link to the content item (as hosted by the publisher computing system 204) in the aggregated content, or restricts access to the content item in the aggregated content. Access may be restricted by omitting the content item (e.g., any link to the content item) from the aggregated content entirely, or by negatively adjusting a score or ranking of the content item such that discoverability of the content item is reduced. For example, a decreased score may cause the link to the content item to show further down (or further to the right, or on a different page, etc.) in a collection of aggregated content.

More broadly, the manner in which the link is provided (if at all) at event 322 may be based on whether the content package satisfies a set of authenticity criteria. One criterion of the set of authenticity criteria is that the publisher's signature be valid. Other criteria, may include, for example, whether the author's digital signature (if also included in the content package) is valid, and/or whether an intended publication source indicated by the author (as described above, and if also included in the content package) matches the publisher associated with the public key used at event 320.

Other criteria may include whether the publisher is included in a list of entities available at a URL address that was included in the content package, as discussed above, and/or whether an expected consumer audience for the aggregated content (e.g., for a particular region) has sufficient user reading (or other access) rights to the content item in view of subscription or other sharing information indicated in the content package, as is also discussed above.

By supplying a publisher's signed content package to authorized aggregators in the manner discussed above, the ability of bad actors to monetize stolen content is severely limited.

Generally, any of the public keys discussed above (author or publisher) may be provided on an as-needed basis, hosted through a particular URL pattern (e.g., nytimes.com/author.txt), or provided through a central repository of public keys hosted through a suitable media platform (e.g., Twitter).

In cases where the content item includes (or consists entirely of) one or more images and/or video, the hashing operations discussed above may act on seed inputs derived from the content item (e.g., an image pixel hash).

In some implementations, the content aggregator creates and publishes/disseminates a configuration file that specifies which portion(s) of any given content item, and possibly which other information related to the content item, must be hashed and/or cryptographically protected with a private key in order for the aggregator to consider providing a link to that content item. For example, an individual associated with the content publisher 106 may use a GUI generated by the content authentication module 230 (or another application/module stored in memory unit 226) to indicate which portions of content are to be hashed and signed at event 302 and/or event 312. For example, the configuration file may indicate that the author name must be signed by the author, while separate hashes of the entire content item and the first paragraph of the content item must be signed by the publisher. Generally, the configuration file may define the set of authentication criteria referred to herein.

In some implementations, the computing system(s) and/or devices of this disclosure utilize a blockchain or other distributed ledger in order to exchange information. A distributed ledger is a storage mechanism for data, events, transactions, etc., that is maintained by multiple participants. More specifically, a distributed ledger is a way of achieving a distributed consensus on the validity or invalidity of information recorded in the distributed ledger. In other words, the distributed ledger provides a decentralized trust to participants and observers. As opposed to relying on a central authority, a distributed ledger is a decentralized database in which a transactional record of changes to the ledger is maintained and validated by each node of a peer-to-peer network. One type of distributed ledger, a blockchain, is comprised of groupings of transactions organized together into a "block," and ordered sequentially (thus the term "blockchain"). While distributed ledgers discussed herein are at times referred to in the context of a blockchain, this is merely one example of a distributed ledger. The techniques of this disclosure could be applied to other types of distributed ledgers besides blockchains, such as a tangle, a block lattice, or other directed acyclic graph (DAG), for example. In any event, nodes may join and leave the blockchain network over time and may obtain blocks from peer nodes that were propagated while the node was gone. Nodes may maintain addresses of other nodes and exchange addresses of known nodes with one another to facilitate the propagation of new information across the network in a decentralized, peer-to-peer manner.

The nodes that share the ledger form what is referred to herein as the distributed ledger network. The nodes in the distributed ledger network validate changes to the blockchain (e.g., when a new transaction and/or block is created) according to a set of consensus rules. The consensus rules depend on the information being tracked by the blockchain and may include rules regarding the chain itself. For example, a consensus rule may include that the originator of a change supply a proof-of-identity such that only approved entities may originate changes to the chain. A consensus rule may require that blocks and transactions adhere to format requirements and supply certain meta information regarding the change (e.g., blocks must be below a size limit, transactions must include a number of fields, etc.). Consensus rules may include a mechanism to determine the order in which new blocks are added to the chain (e.g., through proof-of-work, proof-of-stake, proof-of-authority, proof-of-space, or other suitable consensus algorithm).

Additions to the blockchain that satisfy the consensus rules are propagated from nodes that have validated the addition to other nodes of which the validating node is aware. If all the nodes that receive a change to the blockchain validate the new block, then the distributed ledger reflects the new change as stored on all nodes, and it may be said that distributed consensus has been reached with respect to the new block and the information contained therein. Any change that does not satisfy the consensus rule is disregarded by validating nodes that receive the change and the change is not propagated to other nodes. Accordingly, unlike a traditional system which uses a central authority, a single party cannot unilaterally alter the distributed ledger unless the single party can do so in a way that satisfies the consensus rules. The inability to modify past transactions leads to blockchains being generally described as trusted, secure, and immutable.

In some implementations, some or all of the information conveyed by the messages of FIG. 3 is instead conveyed via a blockchain. For example, the content author may use his or her private key (at event 302) to sign the content item, and then broadcast the content item and signature to nodes of the blockchain to be recorded. In some implementations, the blockchain records a particular conveyance (e.g., sale) of the content item, or of certain rights to the content item (e.g., right to publish), rather than (or in addition to) the content item itself. The content publisher may access the record in the blockchain and use the author's public key (at event 310) to validate the signature, and thus authenticate the content item source.

As another example, the content publisher may use its private key (at event 312) to sign the hashes of the content item (and/or hashes of portions of the content item, etc., as discussed above), and then broadcast the content item and the signature to nodes of the blockchain to be recorded in a new block. Again, in some implementations, the blockchain may record a particular conveyance (e.g., sale) of the content item, or of certain rights to the content item (e.g., right to publish), rather than (or in addition to) the content item itself. The content aggregator may access the record in the blockchain and use the publisher's public key (at event 320) to validate the signature, and thus authenticate the content item source.

Figure 4:
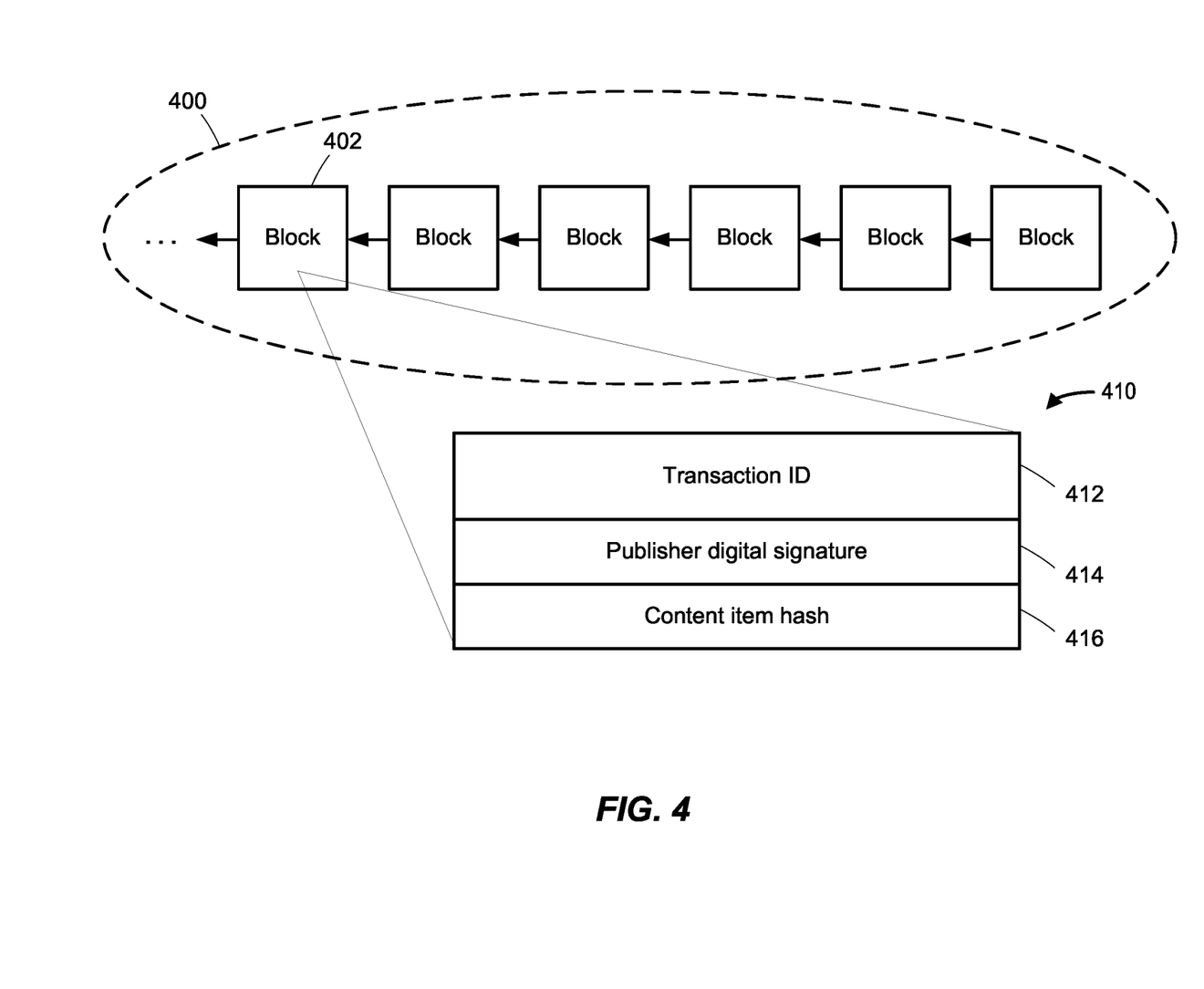
FIG. 4 depicts an example blockchain containing a record that pertains to a particular content item.

FIG. 4 depicts an example blockchain 400 containing a record that pertains to a particular content item (e.g., content item 102) and more specifically, in this example, a particular transaction involving the content item. In a block 402, the example record 410 includes a transaction identifier 412, the publisher's digital signature 414, and a hash 416 of the content item. Alternatively, as discussed above, multiple hashes may be generated based on different portions of the content item, and the record 410 may include each of those hashes. In other implementations the content item hash(es) is/are omitted from the record 416, and/or the record 410 includes the content item itself. Additionally or alternatively, the record 410 may include other information, such as any of the information discussed above as potentially being in the content package (e.g., a URL, subscription information, etc.), or information indicating the rights being conveyed in the transaction, etc. In various implementations and scenarios, the record 410 may be originated by the author device 202 and/or the publisher computing system 204, and may be accessed by the publisher computing system 204 or the aggregator computing system 206, in order to replace some or all of the communications shown in FIG. 3.

Figure 5:
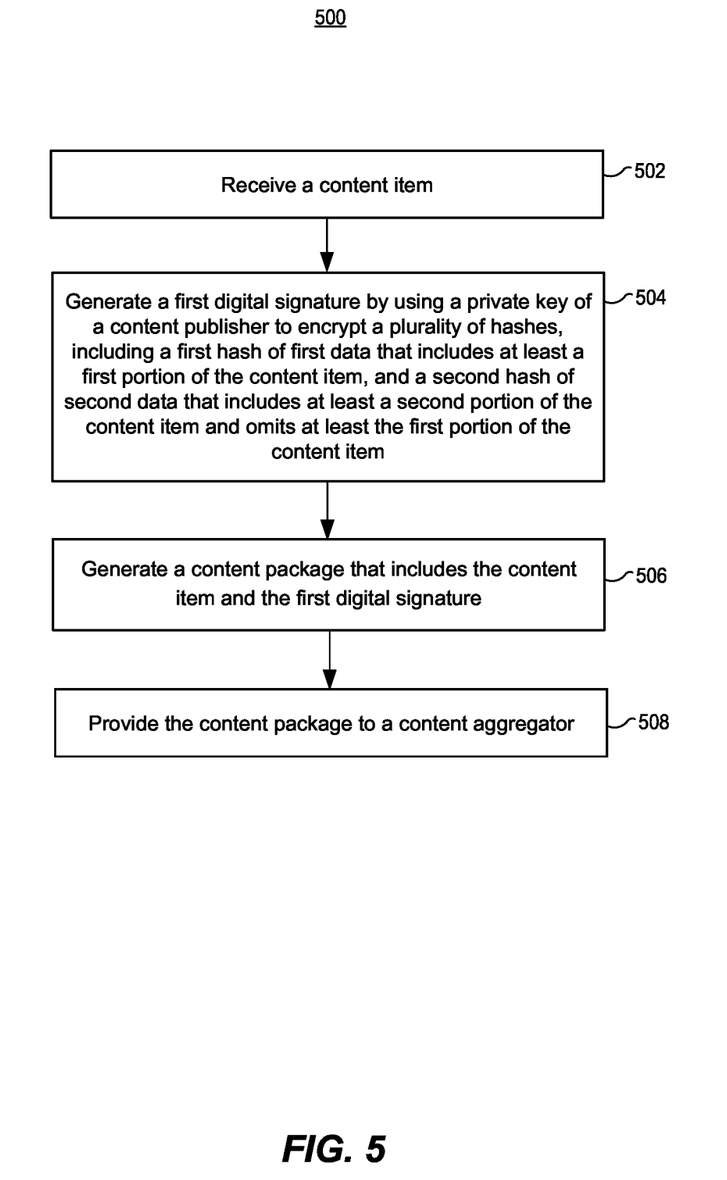
FIG. 5 is a flow diagram of an example method for content authentication performed by a content publisher.

FIG. 5 is a flow diagram of an example method 500 for content authentication when publishing content. The method 500 is performed by a computing system, such as the publisher computing system 204 (e.g., the processing unit 220 when executing instructions of the content authentication module 230), for example.

At block 502, the computing system receives a content item (e.g., content item 102). The computing system may receive the content item from an author of the content item (e.g., from author device 202), or by accessing a distributed ledger (e.g., blockchain 400). In some implementations, the computing system also receives a digital signature (e.g., by accessing the distributed ledger), and uses a public key of the author to check the validity of the digital signature.

At block 504, the computing system generates (e.g., after validating a signature of the author) a first digital signature by using a private key of a content publisher to encrypt a plurality of hashes. The hashes include at least a first hash of first data that includes at least a first portion of the content item, and a second hash of second data that includes at least a second portion of the content item and omits at least the first portion of the content item. For example, the first portion may be an opening paragraph of the content item, and the second portion may be the entire content item.

At block 506, the computing system generates a content package that includes the content item and the first digital signature. As discussed above, the content package may also include other information, such as a URL, subscription information, and so on.

At block 508, the computing system provides the content package to a content aggregator (e.g., to aggregator computing system 206). Alternatively or additionally, the computing system may broadcast the content package (or a portion of the content package, such as the publisher's digital signature) to nodes for recording in the blockchain. Block 508 may include broadcasting the content package to distributed ledger nodes (e.g., nodes of the blockchain 400), or broadcasting a portion of the content package to distributed ledger nodes (e.g., just the first digital signature) and sending another portion of the content package (e.g., the content item itself) directly to the content aggregator, etc.

Figure 6:
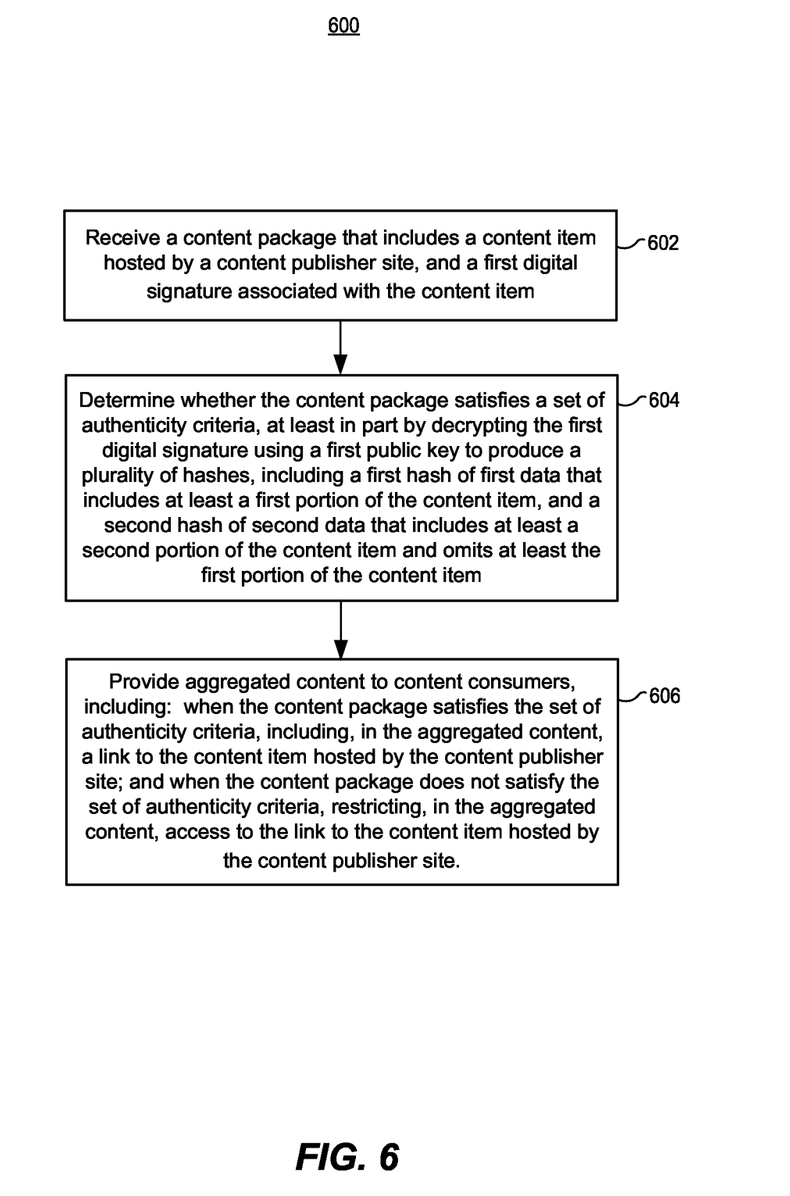
FIG. 6 is a flow diagram of an example method for content authentication performed by a content aggregator.

FIG. 6 is a flow diagram of an example method 600 for content authentication when aggregating content. The method 600 is performed by a computing system, such as the aggregator computing system 206 (e.g., the processing unit 240 when executing instructions of the content authentication module 250), for example.

At block 602, the computing system receives a content package that includes a content item hosted by a content publisher site, and a first digital signature associated with the content item. As discussed above, the content package may also include other information, such as a URL, subscription information, and so on. The computing system may receive the entire content package from a publisher (e.g., publisher computing system 204) and/or by accessing a distributed ledger (e.g., blockchain 400). In the latter case, block 508 may include accessing the distributed ledger to obtain a first portion of the content package (e.g., just the first digital signature), and receiving another portion of the content package (e.g., the content item itself) directly from the content publisher.

At block 604, the computing system determines whether the content package satisfies a set of authenticity criteria. Block 604 includes decrypting the first digital signature using a first public key (associated with the publisher or purported publisher) to produce a plurality of hashes. The hashes include a first hash of first data that includes at least a first portion of the content item, and a second hash of second data that includes at least a second portion of the content item and omits at least the first portion of the content item. For example, the first portion may be an opening paragraph of the content item, and the second portion may be the entire content item.

At block 606, the computing system provides aggregated content to content consumers. When the computing system determines that the content package satisfies the set of authenticity criteria, the computing system at block 606 includes, in the aggregated content, a link to the content item hosted by the content publisher site. When the content package does not satisfy the set of authenticity criteria, the computing system at block 606 restricts, in the aggregated content, access to the link to the content item hosted by the content publisher site. Restricting access may mean omitting the link entirely, or demoting the link (e.g., reducing discoverability of the link at least in part by decreasing a rank or score of the content item).

Additional Considerations

The following additional considerations apply to the foregoing discussion. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter of the present disclosure.

Upon reading this disclosure, those of skill in the art will appreciate still additional alternative structural and functional designs to implement the principles disclosed herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method for establishing content authenticity when aggregating content, the method comprising:
   receiving, by a computing system that includes one or more processors, a content package that includes (i) a content item hosted by a content publisher site, and (ii) a first digital signature associated with the content item;
   determining, by the computing system, whether the content package satisfies a set of authenticity criteria, at least in part by decrypting the first digital signature using a first public key to produce a plurality of hashes, wherein
      the first public key is associated with a particular content publisher,
      a first hash of the plurality of hashes is a hash of first data that consists of a first portion of the content item, and
      a second hash of the plurality of hashes is a hash of second data that includes the first portion of the content item and a second portion of the content item; and
   providing, by the computing system, aggregated content to content consumers, wherein providing the aggregated content includes
      when determining that the content package satisfies the set of authenticity criteria, including, in the aggregated content, a link to the content item hosted by the content publisher site, and
      when determining that the content package does not satisfy the set of authenticity criteria, restricting, in the aggregated content, access to the link to the content item hosted by the content publisher site, wherein restricting access to the link to the content item includes reducing discoverability of the content item, at least in part by decreasing a rank or score of the content item such that the content item is demoted to a lower position within a list of content items.

2. The method of claim 1, wherein receiving the content package includes accessing a distributed ledger to obtain the first digital signature.

3. The method of claim 1, wherein the second data includes an entirety of the content item.

4. The method of claim 1, wherein the content package includes the first public key.

5. The method of claim 1, wherein restricting access to the link to the content item includes omitting the link to the content item from the aggregated content.

6. The method of claim 1, further comprising:
   receiving, by the computing system, a second public key associated with a particular author,
   wherein the content package includes a second digital signature associated with the content item,
   wherein determining whether the content package satisfies the set of authenticity criteria includes decrypting the second digital signature with the second public key to produce an additional hash, the additional hash being a hash of third data that includes at least a portion of the content item.

7. The method of claim 6, wherein the third data indicates a publication date of the content item.

8. The method of claim 7, wherein the third data indicates an intended publication source for the content item.

9. The method of claim 8, wherein determining whether the content package satisfies the set of authenticity criteria includes determining whether the intended publication source matches the particular content publisher associated with the first public key.

10. The method of claim 1, wherein:
    the content package includes a uniform resource locator (URL) of a site providing a listing of authorized entities; and
    determining whether the content package satisfies the set of authenticity criteria includes determining whether the particular content publisher associated with the first public key is included in the listing of authorized entities.

11. The method of claim 1, wherein:
    the content package includes an indication of one or more restrictions on access the content item; and
    determining whether the content package satisfies the set of authenticity criteria includes determining, based at least in part on the one or more restrictions, whether the content consumers are eligible to access the content item.

12. The method of claim 1, wherein the content item includes an image or a video.

13. A computing system comprising:
one or more processors; and
one or more memories storing instructions that, when executed by the one or more processors, cause the computing system to:
receive a content package that includes (i) a content item hosted by a content publisher site, and (ii) a first digital signature associated with the content item;
determine whether the content package satisfies a set of authenticity criteria, at least in part by decrypting the first digital signature using a first public key to produce a plurality of hashes, wherein
the first public key is associated with a particular content publisher,
a first hash of the plurality of hashes is a hash of first data that consists of a first portion of the content item, and
a second hash of the plurality of hashes is a hash of second data that includes the first portion of the content item and a second portion of the content item; and
provide aggregated content to content consumers, wherein providing the aggregated content includes
when determining that the content package satisfies the set of authenticity criteria, including, in the aggregated content, a link to the content item hosted by the content publisher site, and
when determining that the content package does not satisfy the set of authenticity criteria, restricting, in the aggregated content, access to the link to the content item hosted by the content publisher site, wherein restricting access to the link to the content item includes reducing discoverability of the content item, at least in part by decreasing a rank or score of the content item such that the content item is demoted to a lower position within a list of content items.

14. The computing system of claim 13, wherein receiving the content package includes accessing a distributed ledger to obtain the first digital signature.

15. The method of claim 13, wherein the second data includes an entirety of the content item.

16. The method of claim 13, wherein the content package includes the first public key.

17. The computing system of claim 13, wherein:
the instructions further cause the computing system to receive a second public key associated with a particular author;
the content package includes a second digital signature associated with the content item; and
determining whether the content package satisfies the set of authenticity criteria includes decrypting the second digital signature with the second public key to produce an additional hash, the additional hash being a hash of third data that includes at least a portion of the content item.

18. The computing system of claim 17, wherein:
the third data indicates an intended publication source for the content item; and
determining whether the content package satisfies the set of authenticity criteria includes determining whether the intended publication source matches the particular content publisher associated with the first public key.

19. The computing system of claim 13, wherein:
the content package includes an indication of one or more restrictions on access the content item; and
determining whether the content package satisfies the set of authenticity criteria includes determining, based at least in part on the one or more restrictions, whether the content consumers are eligible to access the content item.

20. One or more non-transitory, computer-readable media storing instructions that, when executed by one or more processors, cause the one or more processors to perform operations comprising:
receiving, by a computing system that includes one or more processors, a content package that includes (i) a content item hosted by a content publisher site, and (ii) a first digital signature associated with the content item;
determining, by the computing system, whether the content package satisfies a set of authenticity criteria, at least in part by decrypting the first digital signature using a first public key to produce a plurality of hashes, wherein
the first public key is associated with a particular content publisher,
a first hash of the plurality of hashes is a hash of first data that consists of a first portion of the content item, and
a second hash of the plurality of hashes is a hash of second data that includes the first portion of the content item and a second portion of the content item; and
providing, by the computing system, aggregated content to content consumers, wherein providing the aggregated content includes
when determining that the content package satisfies the set of authenticity criteria, including, in the aggregated content, a link to the content item hosted by the content publisher site, and
when determining that the content package does not satisfy the set of authenticity criteria, restricting, in the aggregated content, access to the link to the content item hosted by the content publisher site, wherein restricting access to the link to the content item includes reducing discoverability of the content item, at least in part by decreasing a rank or score of the content item such that the content item is demoted to a lower position within a list of content items.

\* \* \* \* \*